United States Patent
Ben Abdelaziz

(10) Patent No.: US 10,612,278 B2
(45) Date of Patent: Apr. 7, 2020

(54) VEHICLE STOWAGE ASSEMBLY

(71) Applicant: FAURECIA INTERIEUR INDUSTRIE, Nanterre (FR)

(72) Inventor: Omar Ben Abdelaziz, Beauvais (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 701 days.

(21) Appl. No.: 15/248,087

(22) Filed: Aug. 26, 2016

(65) Prior Publication Data
US 2017/0058577 A1   Mar. 2, 2017

(30) Foreign Application Priority Data
Aug. 28, 2015   (FR) ...................... 15 58024

(51) Int. Cl.
*E05C 19/16*   (2006.01)
*E05B 83/30*   (2014.01)
(Continued)

(52) U.S. Cl.
CPC ................ *E05B 83/30* (2013.01); *B60R 7/06* (2013.01); *E05B 77/12* (2013.01); *E05B 77/54* (2013.01);
(Continued)

(58) Field of Classification Search
CPC .......... E05B 83/30; E05B 81/08; E05C 19/16; Y10T 292/11
(Continued)

(56) References Cited

U.S. PATENT DOCUMENTS 2,565,891 A * 8/1951 Sherman ............... E05B 53/001
                                                       220/230
2,584,480 A * 2/1952 Manting ............... E05C 19/166
                                                       109/63.5
(Continued)

FOREIGN PATENT DOCUMENTS

DE   102007000899 B3   5/2009
DE   102008041724 A1   3/2010
(Continued)

OTHER PUBLICATIONS

French Search Report in French for application No. FR1558024, dated Jul. 4, 2016, 2 pages.
(Continued)

*Primary Examiner* — Carlos Lugo
(74) *Attorney, Agent, or Firm* — Reising Ethington P.C.

(57) ABSTRACT

A vehicle stowage assembly having a housing, a door and a retaining device. The housing has an opening. The door is movable between a closed position and an open position. The retaining device includes a ferromagnetic element, a permanent magnet, an electromagnet, a control unit and a detection device. The electromagnet is magnetically coupled to the ferromagnetic element and/or to the permanent magnet. The control unit controls the electromagnet the electromagnet to reduce the magnetic attraction between the housing and the door to a stop value of less than the nominal value during a stopping period following the detection of the arrival of the door near the closed position. The detection device is able to supply a signal representing the arrival of the door in the closed position to the control unit.

11 Claims, 2 Drawing Sheets

(51) Int. Cl.
  *B60R 7/06* (2006.01)
  *E05B 77/12* (2014.01)
  *E05B 77/54* (2014.01)
  *E05B 81/08* (2014.01)
  *E05B 81/56* (2014.01)
  *E05B 81/70* (2014.01)

(52) U.S. Cl.
  CPC .............. *E05B 81/08* (2013.01); *E05B 81/56* (2013.01); *E05B 81/70* (2013.01); *E05C 19/16* (2013.01); *Y10T 292/11* (2015.04)

(58) Field of Classification Search
  USPC ...................................................... 292/251.5
  See application file for complete search history.

(56) References Cited

U.S. PATENT DOCUMENTS

| | | | | |
|---|---|---|---|---|
| 3,468,576 | A * | 9/1969 | Beyer ..................... | E05C 19/16 220/230 |
| 3,582,017 | A * | 6/1971 | Zecca ..................... | B64G 1/645 102/377 |
| 3,790,197 | A * | 2/1974 | Parker ..................... | E05C 19/16 292/251.5 |
| 3,819,199 | A * | 6/1974 | Smolka ................ | A63C 9/0885 280/612 |
| 7,121,605 | B2 * | 10/2006 | DePue ..................... | B60R 7/06 296/37.12 |
| 7,500,704 | B2 * | 3/2009 | Herrera ..................... | B60R 7/06 296/37.12 |
| 7,583,500 | B2 * | 9/2009 | Ligtenberg ............ | G06F 1/1616 361/147 |
| 8,449,001 | B2 | 5/2013 | Whitens et al. | |
| 8,596,704 | B2 | 12/2013 | Sielhorst et al. | |
| 8,801,054 | B2 * | 8/2014 | Ligtenberg .............. | E05C 19/16 292/177 |
| 9,111,672 | B2 * | 8/2015 | Fullerton ................. | E05C 19/16 |
| 2006/0145485 | A1 * | 7/2006 | Hapke ................. | A47L 15/4259 292/251.5 |
| 2007/0007775 | A1 * | 1/2007 | Gallas ..................... | E05C 19/16 292/251.5 |
| 2008/0174127 | A1 * | 7/2008 | Kim ...................... | E05C 19/166 292/251.5 |
| 2009/0224558 | A1 * | 9/2009 | Ickenroth ................ | E05B 83/30 292/28 |
| 2016/0060910 | A1 | 3/2016 | Ben Abdelaziz | |

FOREIGN PATENT DOCUMENTS

| | | |
|---|---|---|
| FR | 2880600 A1 | 7/2006 |
| FR | 3025157 A1 | 3/2016 |
| WO | WO2015125687 A1 | 8/2015 |

OTHER PUBLICATIONS

Written Opinion in French for application No. FR1558024, dated Jul. 4, 2016, 4 pages.

* cited by examiner

VEHICLE STOWAGE ASSEMBLY

TECHNICAL FIELD

The invention relates to a vehicle stowage assembly, such as a glove compartment.

BACKGROUND

A vehicle stowage assembly is known in the usual manner and is particularly described in document U.S. Pat. No. 8,449,001, comprising:
a housing having an opening,
a door that is mobile in relation to the housing between a closed position in which the door closes the opening of said housing and an open position in which it releases the opening of said housing,
a retaining device comprising:
a ferromagnetic element,
a permanent magnet, the ferromagnetic element and the permanent magnet being provided for one to be on the housing and the other to be on the door, the permanent magnet being magnetically coupled to the ferromagnetic element when the door is in a closed position, such that a magnetic attraction with a nominal value is effected between the housing and the door in the closed position,
an electromagnet magnetically coupled to the ferromagnetic element and/or to the permanent magnet, and
a control unit to control the electromagnet.

Such a stowage assembly is satisfactory, but requires a compromise to be made between an electromagnet procuring high magnetic attraction to prevent the unintentional opening of the door and a less expensive electromagnet procuring less magnetic attraction.

On the other hand, such a stowage assembly tends to generate a slamming noise when the door abuts against the edge of the housing in the closed position. The presence of damping devices in elastomer, rubber or a similar material reduces this noise, but generates in return a force opposing the force created by magnetic attraction when the door is in a closed position.

SUMMARY

The invention aims to reduce the problems with noise, cost and retaining the door in the closed position.

To do this, in accordance with an aspect of the invention, the stowage assembly presents the following features:
the retaining device also comprises a detection device able to supply a signal including information representing the arrival of the door near the closed position to the control unit, and
the control unit controls the electromagnet to reduce the magnetic attraction between the housing and the door to a stop value of less than said nominal value during a stopping period following the detection of the arrival of the door near the closed position.

Therefore, by reducing the force due to magnetic attraction, before the door abuts against the edge of the housing, noise due to this contact is reduced, which eliminates the need for damping elements. Consequently, the absence of damping elements enables the door to be retained more firmly in the closed position, which reduces the risk of inadvertent opening.

According to another feature in accordance with the invention, the stopping period (also referred to as a stopping time) is preferably less than 1 second.

Therefore, the risk of the door leaving the open position during the stopping time because the user released the door quickly after having brought it to the closed position is reduced.

In order to prevent the door from leaving the open position during the stopping time because the user slammed the door without accompanying it to the closed position, the stopping time is advantageously less than 50 milliseconds and preferably less than 30 milliseconds.

According to another feature in accordance with the invention, the stopping time is advantageously over 10 milliseconds and preferably over 20 milliseconds.

Therefore, the stopping time is sufficiently long to prevent the slamming noise within a wide range of door closing speeds.

According to another feature in accordance with the invention, the detection device supplies a binary signal to the control unit and the binary signal changes value when the door arrives near the closed position.

This solution enables the arrival of the door in a determined position near the closed position to be detected in a simple and reliable manner and enables the aforementioned advantages to be procured in most door closings.

According to a complementary feature, the stowage assembly preferably also comprises a lighting device and the lighting device is controlled according to the signal supplied by the detection device.

Therefore, the detection device also enables the housing to be lit when the door is in an open position and enables the lighting device to be turned off when the door is in a closed position.

According to an alternative feature, the detection device preferably comprises a coil and supplies an induced current to the control unit, the current representing the variation in the magnetic field caused by displacement of the door.

Therefore, the detection device supplies more complete information regarding the position of the door to the control unit, making it possible to deduce the displacement of the door. The control unit can consequently modify the control of the electromagnet to also adapt to cases of exceptionally slow (by extending the stopping time) door closings or cases of exceptionally fast door closings by increasing the difference between the stop value and the nominal value of the magnetic attraction of the housing and the door.

According to another feature in accordance with the invention, the stop value is preferably less than 50% of the nominal magnetic attraction value, and is preferably substantially zero; that is, within the range of −10% of the nominal magnetic attraction value to 10% of the nominal magnetic attraction value.

Therefore, the reduction in magnetic attraction substantially reduces the noise due to abutment of the door against the housing, particularly when the magnetic attraction is substantially zero. In practice, when the stop value is substantially zero, the electromagnet generates an opposing magnetic field that is substantially equal in absolute value to the magnetic field generated by the permanent magnet.

According to another feature in accordance with the invention, the stop value of the magnetic attraction between the housing and the door is preferably negative during at least part of the stopping time.

Negative magnetic attraction is understood to refer to the fact that a repulsive magnetic force is effected between the housing and the door. Therefore, the door brakes before it arrives in contact against the housing. Of course, advantageously this repulsion is not high, which would risk preventing the door from arriving in the closed position.

In some embodiments the invention relates to a dashboard of an automobile comprising a stowage assembly in which the housing and the door define a glove compartment.

BRIEF DESCRIPTION OF THE DRAWINGS

Other features and advantages of the present invention will appear in the following detailed description, with reference to the attached drawings in which.

DETAILED DESCRIPTION OF THE ILLUSTRATED EMBODIMENTS

Figure 1:
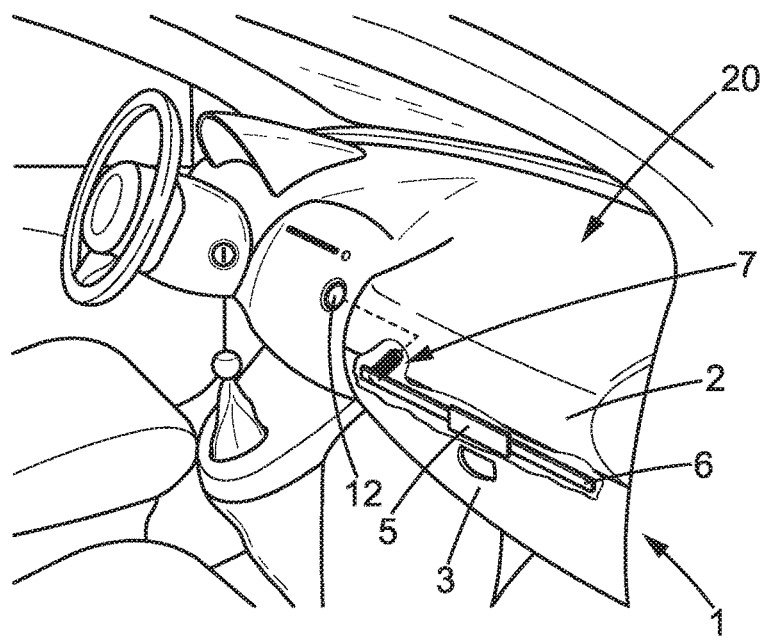
FIG. 1 is a schematic view of a dashboard of a vehicle comprising a stowage assembly in accordance with the invention.

FIG. 1 shows a vehicle dashboard 20 comprising a stowage assembly 1.

Figure 2:
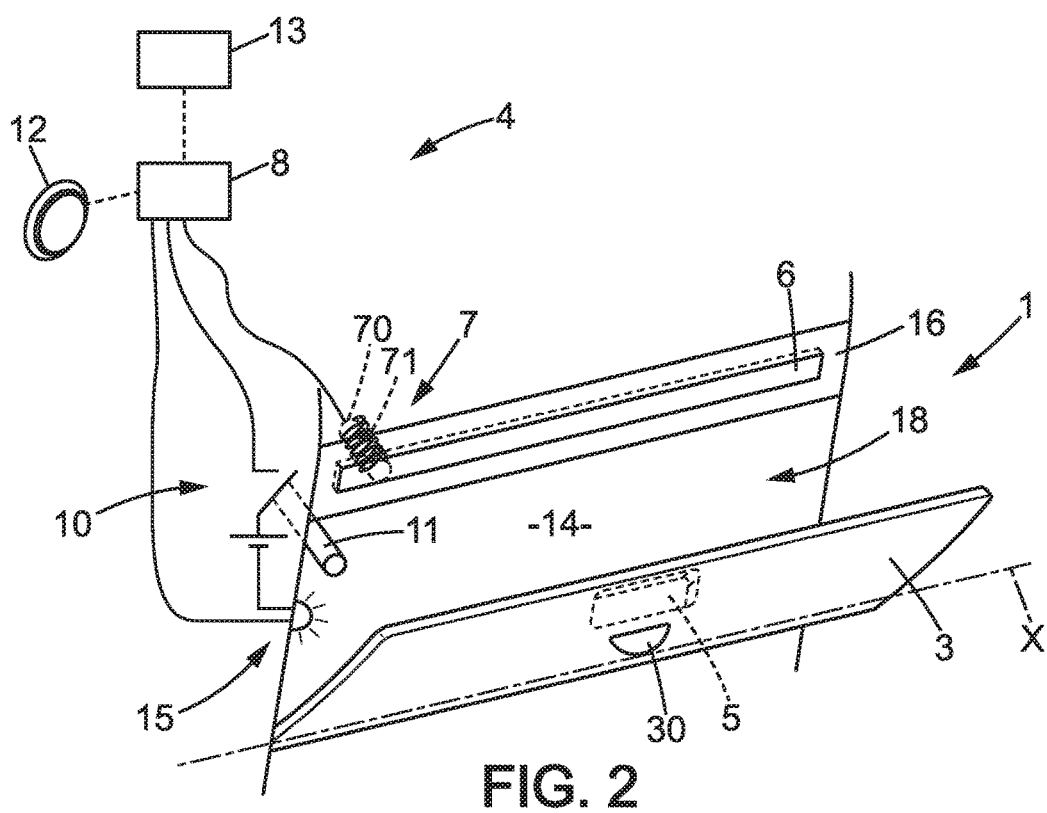
FIG. 2 is an enlarged schematic view in cross-section of the stowage assembly illustrated in FIG. 1 in an open position.

As represented in FIGS. 1 to 2, the stowage assembly 1 essentially comprises a housing 2, a door 3 and a retaining device 4.

The housing 2 defines an inner space of stowage 14. The housing 2 presents an opening 18 allowing access to the inner space of the stowage 14 and a rim 16 disposed in the margin of the opening 18. The door 3 is mobile in relation to the housing 2 between a closed position and an open position. In the closed position, illustrated in FIG. 3, the door 3 abuts against the housing 2 at the rim 16, closes the opening 18 of the housing 2 and prohibits access to the inner space of the stowage 14. In the open position, illustrated in FIG. 2, the door 3 releases the opening 18 of the housing 2 and enables access to the inner space of the stowage 14 of the housing 2.

In the embodiment illustrated, the door 3 is mobile in relation to the housing 2 by pivoting around an axis of rotation X. However, the teachings herein also apply to any other displacement kinetics of a door in relation to a housing, such as mobility in translation, mobility combining rotation and translation or other mobility.

The retaining device 4 selectively enables the door 3 to be retained in a closed position in relation to the housing 2 and the door 3 to be released so that it can be displaced to the open position of the housing 2.

The retaining device 4 comprises a ferromagnetic element 5, a permanent magnet 6, an electromagnet 7, a control unit 8 and a detection device 10. In the embodiment illustrated, the ferromagnetic element 5 is disposed on door 3, while the permanent magnet 6 and the electromagnet 7 are disposed on the rim 16 of the housing 2. The retaining device 4 also comprises an opening control button 12 and an event detection device 13 connected to the control unit 8.

The permanent magnet 6 disposed on the housing 2 and the ferromagnetic element 5 disposed on the door 3 are magnetically coupled when the door 3 is in the closed position of the housing 2, in other words they cooperate by magnetic coupling so as to generate a closing force holding the door 3 in the closed position of the housing 2. In addition, the electromagnet 7 and the permanent magnet 6 are magnetically coupled.

Figure 3:
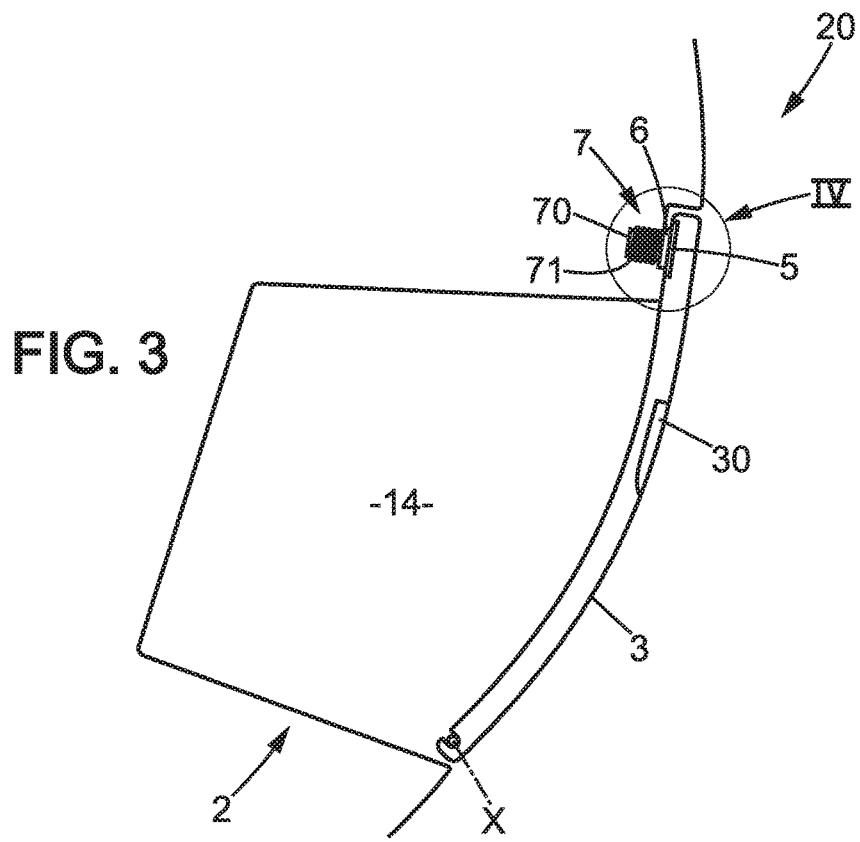
FIG. 3 is a side view of the stowage assembly from FIG. 2, in the closed position of the door.
Figure 4:
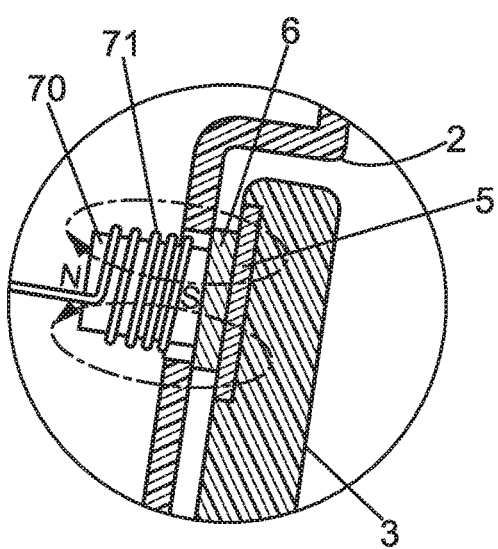
FIG. 4 represents the zone referenced IV in FIG. 3 at an enlarged scale.

As illustrated in FIG. 3, the electromagnet 7 comprises a cylindrical core 70 and a coil 71 surrounding the core 70. The coil 71 is magnetically associated with the permanent magnet 6.

The control unit 8 is able to electrically control the electromagnet 7 to modify the magnetic field to which the ferromagnetic element 5 is subjected in order to modify the force acting on the door 3.

As illustrated in FIG. 2, the detection device 10 comprises a sensor 11 of binary type detecting if the door is near the closed position. In the embodiment illustrated, the sensor 11 is of the pushbutton switch type. In other words, it sends a first signal of constant value (non-zero in the embodiment illustrated) when door 3 is near the closed position (including in the closed position) and a second signal (different from the first signal) of constant value (zero in the embodiment illustrated) when the door is not near the closed position. It should be noted that the signal transmitted by the sensor 11 to the control unit 8 is changed when the door 3 is slightly distant (near) from the closed position, preferably a few millimeters or a few centimeters from the rim 6.

In a variation, other similar sensors capable of detecting the passage of the door to a given position could be used.

The signal of the sensor 11 is used to control a lighting device 15 of the inner space of the stowage 14 or a refrigeration device (not represented) of the inner space of the stowage 14. In a variation, the lighting device 15 could be directly connected to the sensor 11, but the sensor 11 should nonetheless be connected to the control unit.

When the door 3 is in the closed position, the control unit 8 does not supply the electromagnet 7. The electromagnet 7 is then inactive and the ferromagnetic element 5 is only subjected to the magnetic field generated by the permanent magnet 6. For subsequent comparison purposes, the value of the magnetic attraction due to the magnetic field generated by the permanent magnet 6 will be referred to as nominal.

When the event detection device 13 detects a situation that might subject the door 3 to a significant force causing it to open inadvertently, such as a strong acceleration, emergency breaking, collision risk detection or similar detection, the control unit 8 powers the electromagnet 7 to subject the ferromagnetic element 5 to magnetic attraction with a higher than nominal value. In particular, the permanent magnet 7 can be expected to double the magnetic field to which the ferromagnetic element 5 is subjected. In other words, the electromagnet 7 boosts the magnetic attraction force created by the permanent magnet 6, preferably by doubling this force.

When the opening control button 12 is actuated, the command module 8 powers the electromagnet 7, so as to create a magnetic field opposed to that of the permanent magnet 6 so as to cancel, or at least reduce the magnetic attraction value due to the magnetic field to which the ferromagnetic element 5 is subjected and consequently to reduce or cancel the closing force applied to the door 3.

A vehicle occupant can then easily act on the door 3, in particular by inserting his fingers into a recess 30 provided for this purpose in the door 3 to bring the door to the open position. In a variation, the door can, by gravity alone, move to the open position when the control button is actuated.

According to another variation, the control module can supply the electromagnet 7 so as to create a magnetic field opposite to that of the permanent magnet 6 and with a higher value than said nominal value, so as to generate magnetic attraction of negative value, in other words a repulsive magnetic force, on the ferromagnetic element 5. More specifically, in such an embodiment, the control module 9 powers the electromagnet 7 in current such that the electromagnet generates a magnetic field polarizing the ferromagnetic element 5 along the same polarity as the contact surface of the permanent element 6. Therefore, as the ferromagnetic element 5 and the permanent magnet 7 present the same polarity, north or south, a repulsive magnetic force is created between these two elements. Refer to document U.S. Pat. No. 8,215,684 for more information relating to such an embodiment.

When the vehicle occupant wants to close the door 3, he moves it to the closed position. When the door 3 arrives near the closed position, the signal sent by the sensor 11 is modified, as indicated above.

The control unit 8 then powers the electromagnet 7 for a stopping time so that the electromagnet 7 generates a magnetic field opposed to the magnetic field created by the permanent magnet 6, so that the ferromagnetic element 5 is subjected to magnetic attraction of a value less than the nominal magnetic attraction value, or even of negative value (magnetic repulsion).

The stopping time is consequential to the detection by the sensor 11 of the arrival of the door 3 near the closed position. The stopping time is advantageously determined to substantially correspond to the duration between the time when the arrival of the door 3 near the closed position is detected by the sensor 11 and the time when the movement of the door 3 to the housing 2 is stopped, for example by the door 3 abutting against the housing 2 at the level of the rim 16.

The stopping time is advantageously less than 1 second and preferably between 20 and 30 milliseconds.

During the stopping time, the magnetic field to which the ferromagnetic element 5 is subjected is preferably substantially constant and is also reduced at least by half in relation to the magnetic field generated by the permanent magnet 6. In other words, the control unit 8 controls the electromagnet so that it generates a magnetic field opposed to the magnetic field generated by the permanent magnet 6 and at least equal to half of the magnetic field generated by the permanent magnet 6. Therefore, the magnetic attraction between the door 3 and the housing 2 via the ferromagnetic element on one hand and, the permanent magnet 6 and the electromagnet 7 on the other hand is reduced at least by half.

Preferably, during the stopping time, the magnetic field to which the ferromagnetic element 5 is subjected is practically nonexistent. In other words, the control unit 8 controls the electromagnet so that it generates a magnetic field opposed to the magnetic field generated by the permanent magnet 6 and is substantially equal to the magnetic field generated by the permanent magnet 6. Therefore, during the stopping time, practically no magnetic attraction is effected between the door 3 and the housing 2 via the ferromagnetic element on the one hand and, the permanent magnet 6 and the electromagnet 7 on the other hand.

However, according to a variation of embodiment, subjecting the ferromagnetic element 5 to a magnetic field opposed to the magnetic field generated by the permanent magnet alone for at least part of the stopping time is provided. In other words, the control unit 8 controls the electromagnet so that it generates a magnetic field opposite to and higher than (preferably between 1.1 and 2 times higher) the magnetic field generated by the permanent magnet. Therefore, the magnetic attraction between the door 3 and the housing 2 via the ferromagnetic element on one hand and, the permanent magnet 6 and the electromagnet 7 on the other hand is negative, in other words is repulsion.

According to a variation of embodiment, the electromagnet 7 also belongs to the detection device 10, in addition to or instead of the sensor 11. In fact, the electromagnet 7 is only activated to generate a magnetic field during the stopping time and possibly promptly when the door is in the closed position. In other words, the electromagnet is not attracted when the door is not near the closed position or in the closed position. Consequently, after the opening control button 12 is actuated and up to detection of the arrival of the door 3 near the closed position, the electromagnet can be used as a sensor to detect the arrival of the door in the closed position.

More specifically, when the electromagnet 7 is not controlled by the control unit 8, the electromagnet is in a passive state and the control unit 8 is used to receive and monitor an induced current in the electromagnet 7, and more specifically in the coil 71 of the electromagnet 7 due to the variation in the magnetic field caused by the variation in position between the ferromagnetic element 5 and the permanent magnet 6 when the door 3 is displaced between the open position and the closed position.

When the door 3 is near the open position and starts to be displaced by a vehicle occupant to the closed position, the resulting variation in magnetic field and induced current in the electromagnet 7 are low, these two parameters increasing as the door 3 nears the closed position.

Therefore, the control unit 8 is designed so as to monitor the induced current in the electromagnet 7 and to determine the arrival of the door 3 in the closed position of the housing 2, in other words to detect a signal representing the arrival of the door 3 in the closed position, when the induced current in the electromagnet 7 exceeds a predetermined detection threshold. This detection threshold is appropriately chosen, in particular according to the characteristics of the electromagnet 7, the ferromagnetic element 5 and the magnet 6.

Once the detection threshold is reached, the door is near the closed position and the control unit is then used to control the electromagnet 7, as described previously. It is also possible to determine the closing speed of the door 3, so as to consequently modify the stop value of the magnetic attraction controlled by the control unit during the stopping time.

Of course, the invention is not in any way limited to the embodiments described for illustrative, non-limiting purposes. Therefore, in a variation, the electromagnet 7 could be magnetically coupled to the ferromagnetic element 5, without the operation being genuinely changed.

According to another variation, although it is not preferred, it would be possible to dissociate the two functions of the electromagnet by only using the electromagnet 7 to create a magnetic field and provide a core fixed to the door 3 and a coil fixed to the housing and connected to the control unit to detect the arrival of the door near the closed position.

The invention claimed is:

1. A vehicle stowage assembly for reducing slamming of a door of the vehicle stowage assembly, the vehicle stowage assembly comprising:
    a housing having an opening,
        wherein the door is configured to be movable in relation to the housing between a closed position in which the door closes the opening of said housing and an open position in which it uncovers the opening of said housing;
    an opening element configured to allow said door to move from the closed position to the open position; and a retaining device comprising:
  a ferromagnetic element,
  a permanent magnet, the ferromagnetic element and the permanent magnet being provided for one to be on the housing and the other to be on the door, the permanent magnet being magnetically coupled to the ferromagnetic element when the door is in a closed position, such that a magnetic attraction with a nominal value is effected between the housing and the door in the closed position,
  an electromagnet magnetically coupled to the ferromagnetic element or to the permanent magnet, and
  a detection device configured to supply a signal to a control unit, the signal including information representing the arrival of the door near the closed position, wherein when the control unit receives the signal from the detection device, the control unit is configured to control the electromagnet to reduce the magnetic attraction between the housing and the door to a stop value of less than said nominal value during a stopping time following the detection of the arrival of the door near the closed position.

2. The stowage assembly according to claim 1 wherein the stopping time is less than 1 second.

3. The stowage assembly according to claim 2 wherein the stopping time is less than 50 milliseconds, preferably less than 30 milliseconds.

4. The stowage assembly according to claim 1 wherein the stopping time is over 10 milliseconds, preferably over 20 milliseconds.

5. The stowage assembly according to claim 1 wherein the detection device supplies a binary signal to the control unit and the binary signal changes value when the door arrives near the closed position.

6. The stowage assembly according to claim 5 wherein the stowage assembly also comprises a lighting device and the lighting device is controlled according to the signal supplied by the detection device.

7. The stowage assembly according to claim 1 wherein the detection device comprises a coil and supplies an induced current to the control unit, the current representing the variation in the magnetic field caused by displacement of the door.

8. The stowage assembly according to claim 1 wherein the stop value is less than 50% of the nominal magnetic attraction value.

9. The stowage assembly according to claim 8, wherein the stop value is between −10% of the nominal magnetic attraction value and 10% of the nominal magnetic attraction value.

10. The stowage assembly according to claim 1 wherein the stop value of the magnetic attraction between the housing and the door is negative during at least part of the stopping time.

11. A vehicle dashboard comprising a stowage assembly according to claim 1 wherein the housing and the door define a glove compartment.

* * * * *